United States Patent
Knox

Patent Number: 6,151,144
Date of Patent: *Nov. 21, 2000

[54] WAVELENGTH DIVISION MULTIPLEXING FOR UNBUNDLING DOWNSTREAM FIBER-TO-THE-HOME

[75] Inventor: Wayne H. Knox, Holmdel, N.J.

[73] Assignee: Lucent Technologies, Inc., Murray Hill, N.J.

[*] Notice: This patent is subject to a terminal disclaimer.

[21] Appl. No.: 09/009,439

[22] Filed: Jan. 20, 1998

[51] Int. Cl.⁷ ...................................................... H04J 14/02
[52] U.S. Cl. ........................... 359/125; 359/124; 359/127
[58] Field of Search .................................... 359/125, 127, 359/133, 124

[56] References Cited

U.S. PATENT DOCUMENTS

| | | | |
|---|---|---|---|
| 5,341,365 | 8/1994 | Clarke | 370/17 |
| 5,426,701 | 6/1995 | Herrmann et al. | 380/52 |
| 5,453,988 | 9/1995 | Clarke | 370/95.3 |
| 5,479,286 | 12/1995 | Stalley et al. | 359/125 |
| 5,548,432 | 8/1996 | Clarke et al. | 359/137 |
| 5,574,584 | 11/1996 | Darcie et al. | 359/125 |
| 5,594,578 | 1/1997 | Ainslie et al. | 359/127 |
| 5,631,758 | 5/1997 | Knox et al. | 359/127 |
| 5,768,539 | 6/1998 | Metz et al. | 395/200.79 |
| 5,799,081 | 8/1998 | Kim et al. | 380/5 |
| 5,808,762 | 9/1998 | Vanoli et al. | 359/124 |
| 5,878,134 | 3/1999 | Handelman et al. | 380/4 |
| 5,880,865 | 3/1999 | Lu et al. | 359/125 |
| 5,973,475 | 10/1998 | Combaluzier | 320/107 |

OTHER PUBLICATIONS

C. R. Giles et al., "Access PON Using Downstream 1550–nm WDM Routing and Upstream 1300–nm Combining Through a Fiber–Grating Router", IEEE Photonics Technology Letters vol. 8, No. 11, (1996).

Lucent Technologies, "Dense Wavelength Division Multiplexers", 1997.

"Dense WDM Multiplexing", Piriodical, Photonic Integration Research, Inc., No. 12, Feb., 1997.

*Primary Examiner*—Huy D. Vu
*Assistant Examiner*—Dalzid Singh
*Attorney, Agent, or Firm*—Ratner & Prestia

[57] ABSTRACT

The passive optical network system and method for providing a predetermined wavelength of data to remote users according to the present invention includes a multiple wavelength transmitter for transmitting a multiwavelength signal. The multiwavelength signal includes a plurality of signal components of predetermined wavelengths provided by a plurality of access providers. Each access provider provides a signal component of wavelength different from that of the other access providers. A power-splitting passive optical network receives and power-splits the multiwavelength signal into a plurality of distributed multiwavelength signals each associated with a respective remote user. A filter selectively filters out, for each remote user, ones of the signal components of the associated distributed multiwavelength signal to provide the remote user with a selected one signal component of predetermined wavelength.

17 Claims, 6 Drawing Sheets

WAVELENGTH DIVISION MULTIPLEXING FOR UNBUNDLING DOWNSTREAM FIBER-TO-THE-HOME

FIELD OF THE INVENTION

The present invention relates in general to a passive optical network (PON) system. In particular, the present invention describes multiple access providers in a central office, each having a multiple wavelength transmitter that sends at least one bandwidth to a power-splitting PON and a filter incorporated in each of the remote optical network units (ONUs) such that each ONU in the PON receives only one selected bandwidth.

BACKGROUND OF THE INVENTION

The desire to have high capacity information conduits reaching residential customer premises has promoted intense interest in broadband transmission over copper cable, wire, wireless, and optical fiber media. Fiber-to-the-home, in which optical fiber transport is used over the entire path, is appealing for its large information capacity. Various techniques are available for separating different services for transmission over the same lines, for example the transmitted signals may be time, wavelength, or sub-carrier frequency multiplexed.

Passive optical networks (PONs) are architectures in which there are no intervening active components between the host digital terminal or central office (CO) and customer premises. PONs are desirably installed into remote units, such as homes, to provide data such as video and audio and the like over a fiber.

In other words, PONs require no active components for directing optical signals between the CO and a network subscriber's terminal equipment. Passive optical networks, therefore, require no power or processing in the field to direct optically encoded information to its destination. Typically, a PON includes a first fiber star formed as a plurality of optical paths extending from the CO to a remote node. Downstream optical signals are transmitted from the CO to the remote node. where the signal is passively split and distributed to one of a plurality of units of network subscriber equipment. The network units may transmit optically encoded signals upstream to the remote node to form a multiplexed signal for distribution to the CO. Lasers are generally used to generate light used to form the transmitted light signals.

Figure 1:
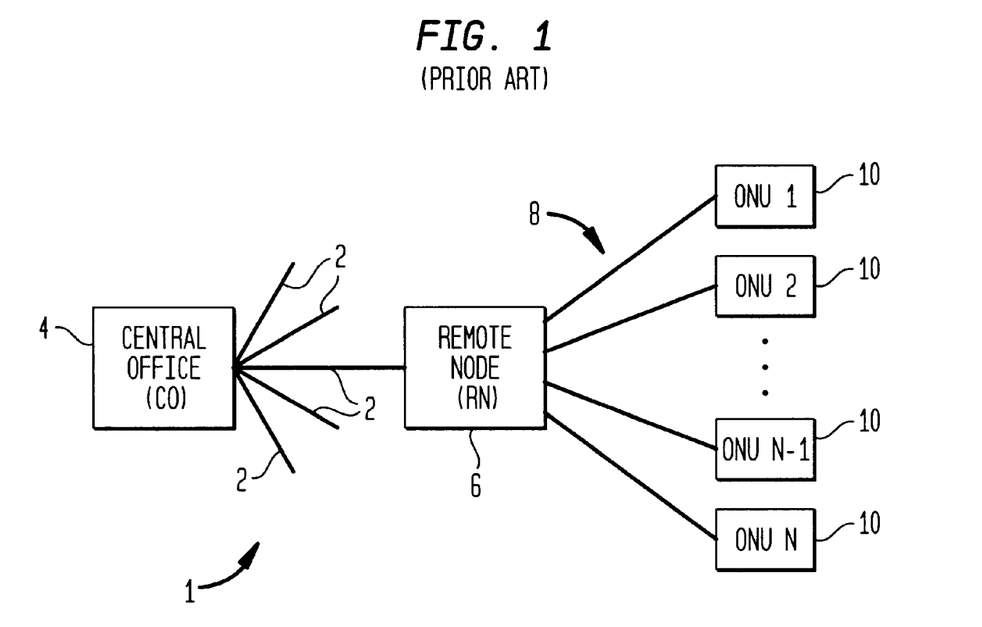
FIG. 1 is a diagram of a conventional passive optical network model.

A standard PON model is shown in FIG. 1, and consists of a first fiber star 1, typically a plurality of optical fibers 2 extending from a central office 4, to one of a plurality of remote nodes 6, i.e., $RN_1$, $RN_2$, ... $RN_N$. Downstream signals are transmitted from the CO 4 towards the remote node for further distribution. At the remote nodes, light is passively split and distributed via a plurality of optical fibers 8 (a second star) to a plurality of optical network units (ONUs) 10, i.e., $ONU_1$, $ONU_2$, ... $ONU_N$. The ONUs 10 provide service to one or more end users wherein each downstream optical signal is received and electronically distributed to end users. The ONUs 10 may transmit upstream signals which are combined at the remote node. Each remote node 6 (or passive star) passively combines transmissions from the ONUs 10 onto a single optical fiber 2 for distribution to the CO.

Two passive optical network architectures are a telephony over passive optical network (TPON) and a wavelength division multiplexing passive optical network (WDM PON). In a TPON architecture, a CO broadcasts a downstream optical signal to all ONUs using time division multiplexing (TDM) protocol. A laser with a common wavelength band, requiring synchronization, may also be used. TDM typically includes a frame of information subdivided into time slots assigned to individual ONUs.

Wavelength division multiplexing (WDM) is a technology in which multiple wavelengths share the same optical fiber in order to increase the capacity and configurability of networks. WDM generally increases optical system capacity by simultaneously transmitting data on several optical carrier signals at different wavelengths. The total system capacity is increased by a factor equal to the number of different wavelength channels. WDM PONs utilize an architecture within which each ONU or subscriber is assigned a unique wavelength by the central office. Signals destined for each remote node (and ultimately, each optical network unit) are created by modulating light at N distinct wavelengths at the CO. The modulated light is multiplexed onto a fiber directed to the remote node. The downstream signals are split and distributed to the ONU as a function of wavelength within a wavelength division demultiplexer at the remote node. In the upstream transmission direction (optical network unit to remote node), the light is transmitted at assigned wavelengths, typically by a laser.

Compared to TDM PONs, WDM PONs have the advantage that they do not broadcast individual subscribers' data to all premises. As a result, privacy is enhanced and the electronics in the ONU need only operate at the subscriber's data rate. However, upstream transmission through a wavelength routing device can be difficult. Temperature-controlled single-frequency lasers at each home are impractical. Spectral slicing of light emitting diodes and the use of modulators combined with an optical loopback have also been used. Another approach is to use low-cost, uncooled Fabry-Perot lasers at the home and combine them at the remote node with a passive splitter. This approach is costly because it requires extra fiber and an extra passive component (a WDM splitter) at the remote node, unless a single passive device can accomplish both downstream wavelength routing and upstream power combining. Thus, wavelength division multiplexing, with different services on different wavelengths, requires additional optical transmitters and receivers to be installed wherever an expansion of services and additional channels is required. Each remote unit is assigned a different frequency using a wavelength router. However, due to a number of technical problems, this WDM system is not commercially viable for mass market applications like fiber distribution to the home. One such problem is the small number of channels currently accommodated. Present multichannel laser diodes are very difficult to fabricate with acceptable yield even with as few as eight channels. In addition, passive WDM splitters currently available have a large temperature variation of their passband channels, thereby requiring a continuous tunability in the multichannel sources that has not yet been achieved.

Another type of PON is a power splitting PON (PSPON) which is used with a single-wavelength TDM-encoded transmitter in the central office. One fiber from the CO is directed into a standard power splitter instead of a wavelength splitter. Thus, each remote unit gets a fraction of the total power. This is a time domain multiplexing protocol in which all remote units get the same data, but only the data intended for the particular remote unit is retrieved by the remote unit using, an ID code, for example. These wavelength-independent PSPONs utilize time division multiplexed access (TDMA) for signaling in both directions and passive optical splitters for branching, thereby achieving low cost, while compromising power budget, signaling integrity, and security.

Although the art of transmitting data from a central office to a remote unit is well developed, there remain some problems inherent in this technology. One particular problem is efficiently providing data at different wavelengths to different remote units. Therefore, a need exists for a system that provides data at different wavelengths to different remote units that is less expensive and complex than those using a WDM splitter.

SUMMARY OF THE INVENTION

The passive optical network system and method for providing a predetermined wavelength of data to remote users according to the present invention includes a multiple wavelength transmitter for transmitting a multiwavelength signal. The multiwavelength signal includes a plurality of signal components of predetermined wavelengths provided by a plurality of access providers. Each access provider provides a signal component of wavelength different from that of the other access providers. A power-splitting passive optical network receives and power-splits the multiwavelength signal into a plurality of distributed multiwavelength signals each associated with a respective remote user. A filter selectively filters out, for each remote user, ones of the signal components of the associated distributed multiwavelength signal to provide the remote user with a selected one signal component of predetermined wavelength.

The foregoing and other aspects of the present invention will become apparent from the following detailed description of the invention when considered in conjunction with the accompanying drawings.

DESCRIPTION OF EXEMPLARY EMBODIMENTS AND BEST MODE

The present invention is directed to upgrading an existing power-splitting passive optical network (PSPON) to act as an effective full wavelength division multiplexed (WDM) PON. Instead of sending one wavelength down the fiber with a single-wavelength TDM-encoded transmitter as in a PSPON, the present invention uses multiple access providers that each use a multiwavelength transmitter in a central office (CO) and each sends at least one wavelength to the PSPON. There is no change to the remote passive power-splitting node. Each optical network unit (ONU) at a remote unit receives all the wavelengths. A filter is placed in each ONU so that each remote unit receives a particular, though not necessarily different, wavelength. This effectively acts as a WDM PON at a much lower cost than a true WDM PON. The ONUs are preferably identical.

The present invention uses flexible TDM bandwidth allocation, as in a conventional PSPON system. Upstream is still shared unless otherwise provided. It appears to every access provider (such as AT&T, MCI, etc.) that they own the entire PON. If a new access provider accesses the PON, the total bandwidth that the other access providers can deliver is not reduced. Consumers are readily able to switch providers by using a filter to change the wavelength they receive.

Figure 2:
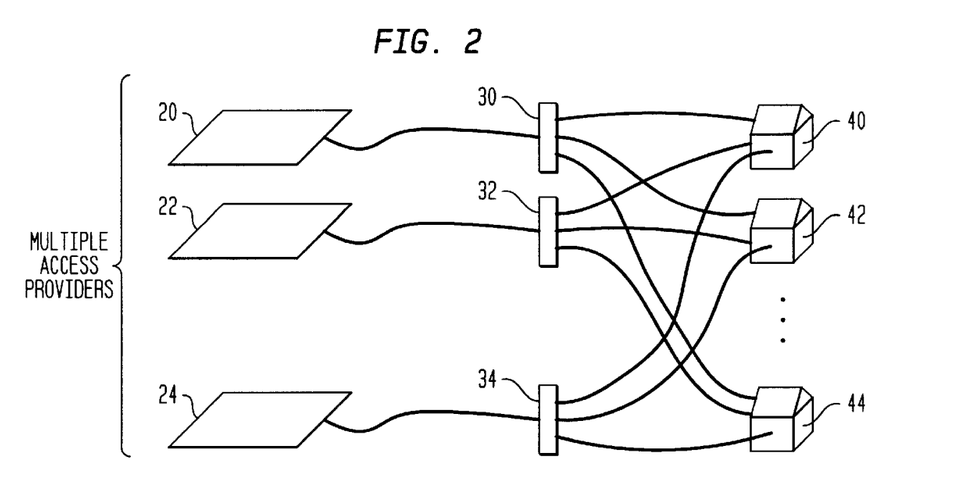
FIG. 2 is a diagram of an exemplary network system in accordance with the present invention.

FIG. 2 shows an exemplary network system in which multiple access providers 20, 22 and 24 each have access to all the remote units 40, 42, 44 through respective power splitters 30, 32, 34. For example, first provider 20 provides a signal at a particular bandwidth (or wavelength) to a power splitter 30. The power splitter 30 distributes the signal to every remote unit 40, 42, 44 in the system. Each remote unit 40, 42, 44 having the proper receiving equipment receives the signal.

Figure 3:
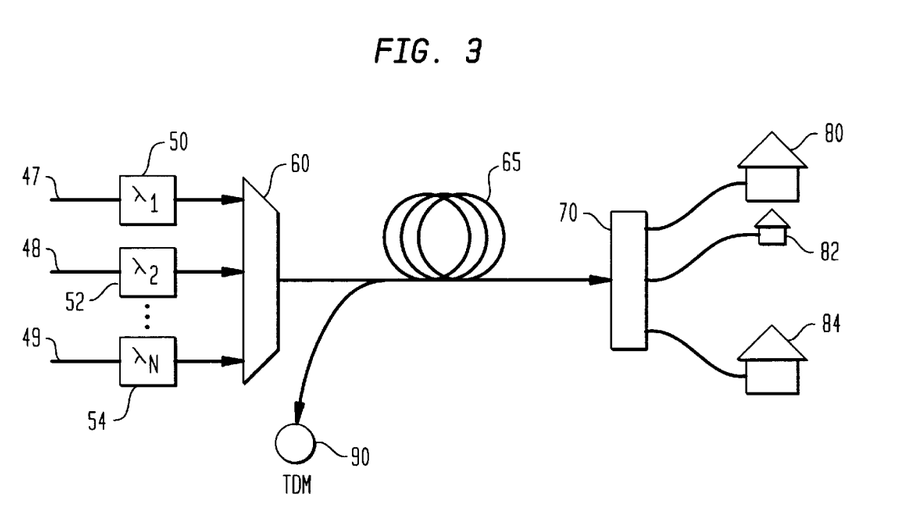
FIG. 3 is a diagram of another exemplary network system in accordance with the present invention.

FIG. 3 shows another exemplary network system in which multiple access providers 47, 48, 49 each have access to all the remote units 80, 82, 84 in a system. Each of the three shown access providers 47, 48, 49 transmits using a respective distributed feedback laser 50, 52, 54 which transmit at different wavelengths $\lambda_1$, $\lambda_2$, $\lambda_N$. The optical signals are passed through a multiple channel filter device such as a waveguide grating router or power splitter 60 and passed to the optical fibers 65 comprising a distribution system. The signals are received at a power splitter 70 (e.g., a 1×M power splitter) and provided to the remote units 80, 82, 84 which have an appropriate filter to receive the desired signals and filter out the unwaited or unauthorized signals. An upstream shared time division multiplexer 90 is also shown and is used to transmit optically encoded signals upstream to the remote node to form a multiplexed signal for distribution to the CO.

Figure 4A:
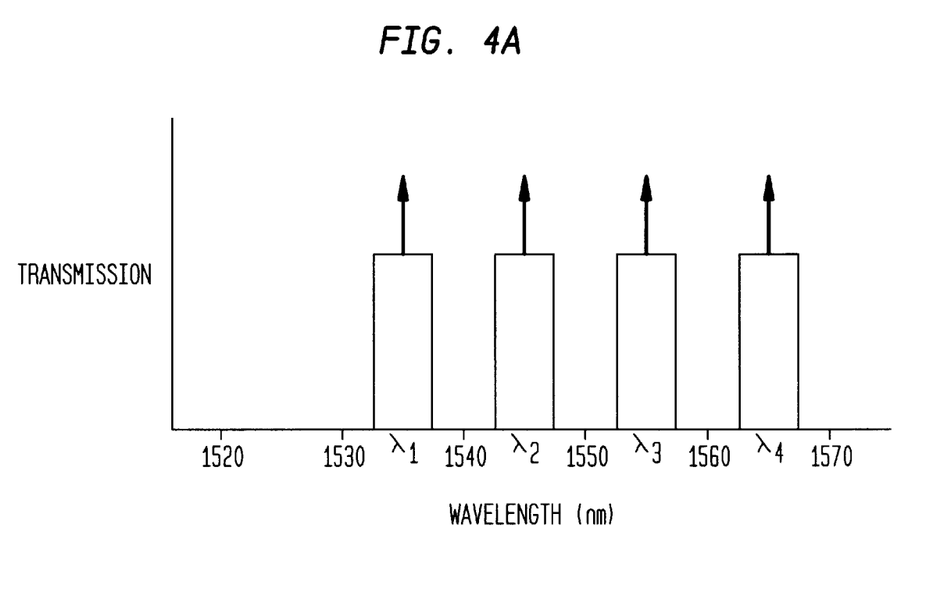
FIG. 4A shows a chart showing transmission vs. wavelength for various access providers in an exemplary network system.
Figure 4B:
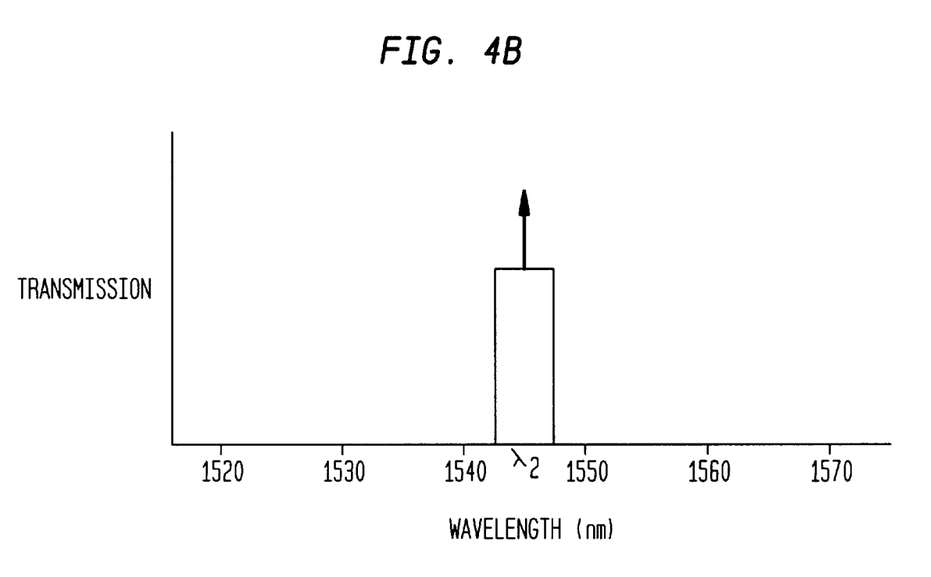
FIG. 4B shows a chart showing transmission vs. wavelength of filtered data received at a remote unit.

Each remote unit has equal access to all service providers using provider WDM (PWDM) and ONU filtering. Optical filtering at the ONU provides flexibility. The PSPON sends all the wavelengths to all the customers on a PON. Each access provider uses a different wavelength to transmit their data, as shown for four exemplary providers in FIG. 4A. Provider 1 transmits data at a first bandwidth of wavelength $\lambda_1$, provider 2 transmits data at a second bandwidth of wavelength $\lambda_2$, provider 3 transmits data at a third bandwidth of wavelength $\lambda_3$, and provider 4 transmits data at a fourth bandwidth of wavelength $\lambda_4$. Each remote unit receives all the bandwidths and wavelengths, thus all the data, but each remote unit contains a filter so that only the desired wavelength or data is ultimately received by the user. For example, as shown in FIG. 4B, only the data from provider 2 having a bandwidth wavelength $\lambda_2$ is received by the user after filtering. Thus, the data from each access provider is transmitted to each remote unit. At the remote unit, a filter is provided so that the user at the remote unit filters out the unwanted data and only gets the bandwidth it subscribes to. Thus, each access provider has access to the full downstream PON bandwidth (e.g., 622 Mb/s). The customer can change access provider by changing the optical filter provided on an access card.

Figure 5:
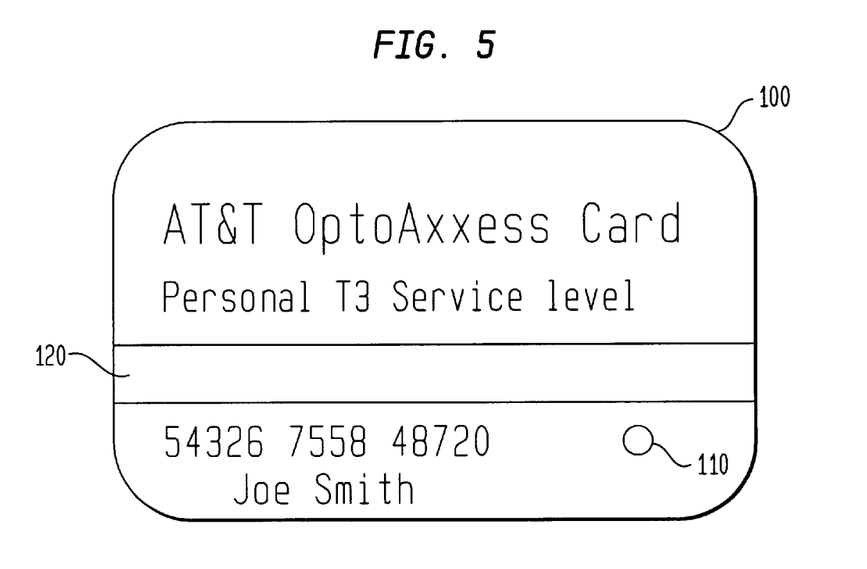
FIG. 5 shows an exemplary access card in accordance with the present invention.

As described above, each ONU receives all the wavelengths sent by all the access providers, and a filter is used at the remote unit to provide the wavelengths in the bandwidth that the user seeks access to. Preferably, the filter is incorporated into a card that each user receives. An exemplary card 100 in accordance with the present invention is shown in FIG. 5. The card 100 incorporates an optical filter 110 and a magnetic stripe 120, barcode, or other means for user verification and identification. Accordingly, wavelength-encoding is possible. Thus, a card with an optical filter in it is provided to the remote end user (e.g., a consumer or access provider subscriber) who uses it to select the bandwidth wavelengths or channel that the remote unit is to receive. The filter 110 can be a transmissive or reflective holographic filter, a transmissive or reflective interference filter, or any type of transmissive or reflective thin-film optical filter. Thus, the user can change (e.g., upgrade) to different wavelengths by having a different filter put on the card; e.g., the user can upgrade from a low cost, low speed data channel to a more expensive, high speed data channel.

The user selects the bandwidth to receive by inserting the card into an ONU at the remote unit. As described, a thin-film narrowband optical filter is laminated into the card, and that portion of the card is positioned between a fiber exit and a receiver preferably using a graded index (GRIN) lens. The magnetic stripe is read by the ONU and sends back a signal indicating that the authorized user is receiving the correct bandwidth signal. Many other conventional security measures could be incorporated to deter counterfeiting.

The filter passband is preferably made highly temperature-independent, and designed for high transmittance. The power budget for the present invention is not much different than a conventional PSPON because current CPON routers specify a 10 dB on-channel loss, compared to a 12 dB loss for a 16-port power splitter. This also eliminates the wavelength routers completely from the CPON, along with a temperature tuning problem that causes many problems.

Figure 6:
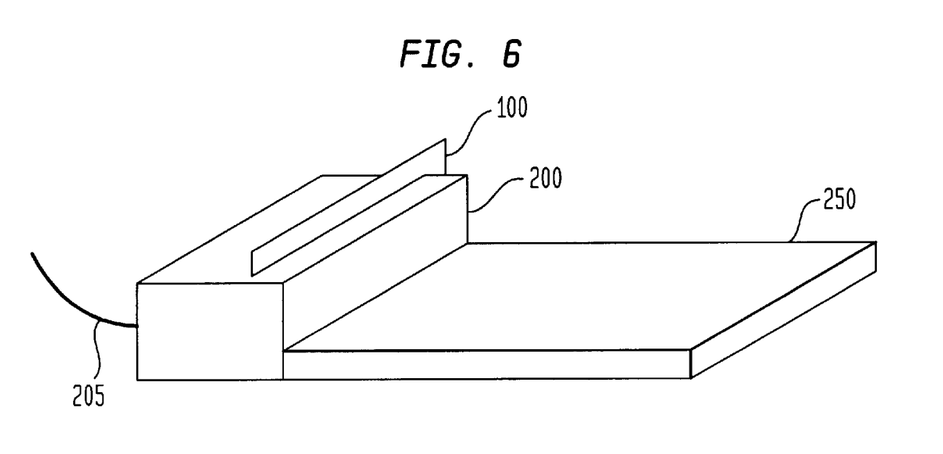
FIG. 6 shows an exemplary optical network unit in accordance with the present invention.
Figure 7:
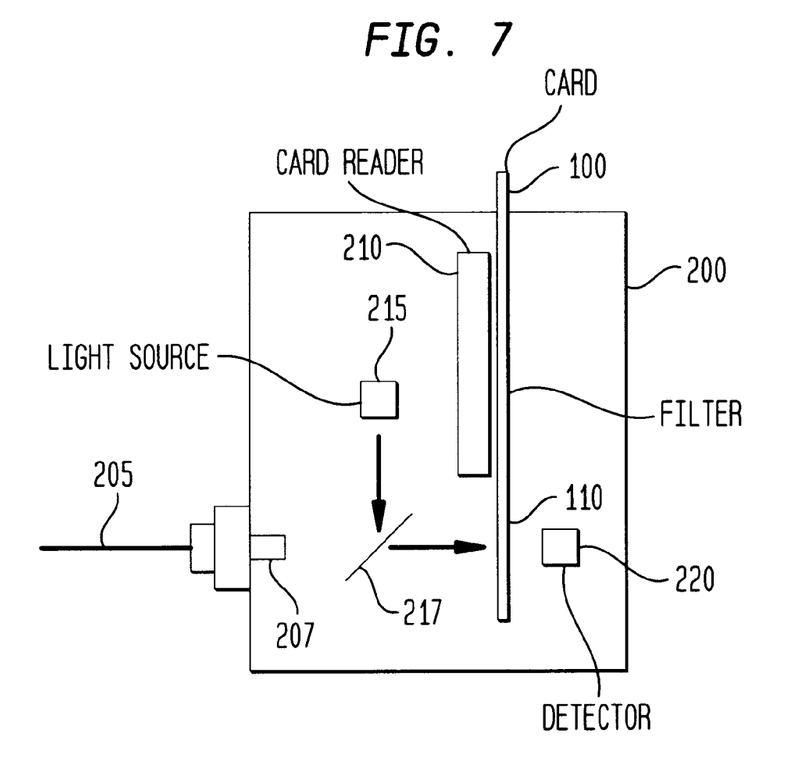
FIG. 7 shows further detail of the exemplary optical network unit shown in FIG. 6.

An exemplary ONU 200 in accordance with the present invention is shown in FIGS. 6 and 7. The broad spectrum output from a suitable optical source (not shown)—illustratively, a light emitting diode (LED) having an output centered at a typical telecommunications wavelength such as, for example, 1.55 μm—provides the incoming data signal to an ONU 200 through a fiber 205. The ONU 200 has a card reader 210 in which the user inserts the card 100 containing the filter 110. The card reader 210 reads the magnetic stripe 120 or barcode for user identification and verification. The incoming optical signal passes through a GRIN lens 207 which acts as a receiver, passes through a dichroic mirror 217, and passes through the optical filter 110 on the card 100. A detector 220, preferably a 1.55 μm light detector, detects the transmitted optical signal that passes through the filter 110 and provides it to the next part of the system, for example, a conventional person computer miniature card interface adapter 250 (PCMCIA). A source 215, preferably a 1.3 μm light source, is used for upstream transmission from the remote unit to the CO.

It should be noted that although an output spectrum centered about 1.55 μm is shown and described, it is nonetheless contemplated that the output spectrum of the optical source might alternatively be centered about some other wavelength of interest such, for example, as 1.3 μm, and that reference herein to any particular wavelength band is by way of illustrative example only.

An exemplary system in accordance with the present invention is now described. Assume that a PSPON with a 16-way power splitter is running a TDM data format into identical ONUs, and the total capacity, preferably 52 or 155 Mb/s, or any of the low data rate systems as required for local access, is shared between the 16 users. This existing PSPON is upgraded to a full WDM PON without changing the outside plant based on the following.

A multiwavelength transmitter is installed in the CO for each PON and emits signals on a predetermined number of different wavelengths (or wavelength channels) at a predetermined data rate, preferably 16 different wavelengths at a 52 or 155 Mb/s data rate per channel, for local access applications. Each customer on the PON receives a card that is to be inserted into the ONU. A small thin-film interference filter is laminated into each card and transmits one of the wavelength bands. When inserted, the filter is disposed between the fiber and the detector, preferably using one or a pair of GRIN lenses. The filter peak transmission is made high (preferably about 80%) and the blocking of adjacent channels is set greater than 20 dB, with a substantially flat top. The passband of the filter is rendered temperature insensitive using conventional methods such as those used in current WDM routers. Therefore, the temperature tuning problem of the WDM routers is not present in the exemplary embodiment; therefore, large wavelength spacings are not required for 'set-and-forget' operation.

When the card is inserted, information is read from the card to ensure that the correct customer is receiving the correct data. Conventional "Smart Card" security features can be incorporated to prevent counterfeiting.

Because the filter passes WDM formatted data, time-demultiplexing electronics is not needed in the ONU. Each ONU receives the full 52 or 155 Mb/s, and can be further upgraded to a high data rate system of 622 Mb/s, if desired.

With respect to the total loss, a 16-way power split causes a 12 dB loss, and conventional WDM routers cause a 10 dB loss, therefore as long, as the filter transmission is nearly 100% at peak, the loss budgets are comparable. In a PSPON, receivers operate at 155 MHz or greater.

In another exemplary embodiment, instead of putting the filters inside the ONUs, the filters are placed inside the remote splitting node. The filters preferably transmit the 1.3 μm light also. Such two-band filters could be made with a slightly more complex layer design, however getting out of the fiber and back into the fiber is much more complex and expensive than just putting the interference filter in front of the photodetector in the ONU, especially if the remote splitter has to be a rugged unit that hangs on the side of a telephone pole.

Figure 8:
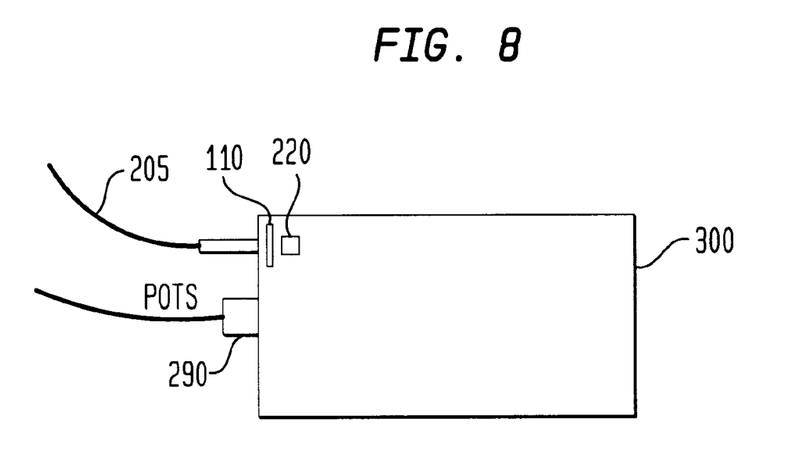
FIG. 8 shows a further exemplary device in accordance with the present invention.
Figure 9:
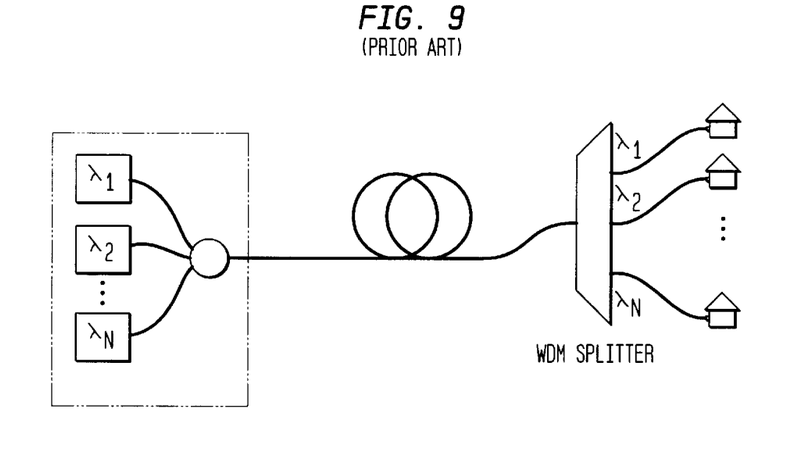
FIG. 9 diagram of a conventional wavelength division multiplexed passive optical network.
Figure 10:
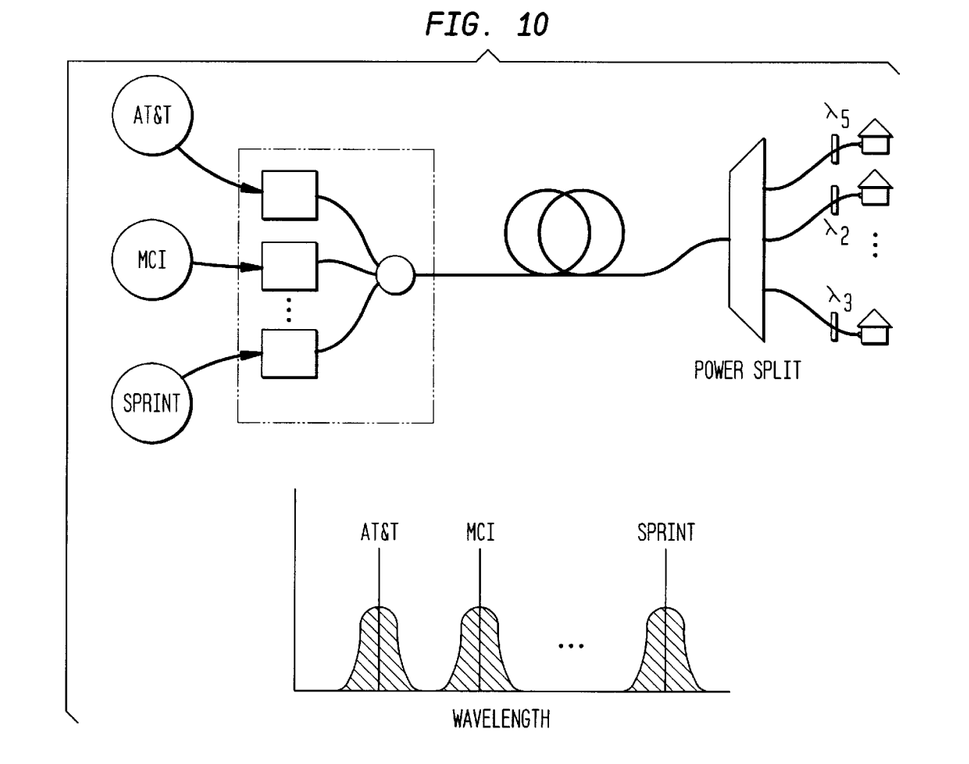
FIG. 10 shows an exemplary optical network unit in accordance with the present invention.

In another exemplary embodiment, as shown in FIG. 8, the entire ONU is put into a PCMCIA-type card 300, so that it incorporates all the features of the ONU, including the filter 110, and can be easily exchanged by the user. The PCMCIA card contains the optical filter 110 and the customer registration information. Because this is WDM, no time demultiplexing electronics is required, thereby simplifying and reducing power requirements. Also provided, though optional, is a POTS (plain old telephone service) input 290. It should also be noted that the upstream laser diode would have to be built into this unit, also.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed is:

1. A method of operating a passive optical network providing a predetermined wavelength of data to remote users comprising the steps of:

a) providing, by a plurality of access providers, a plurality of signal components of predetermined wavelengths, each access provider providing a signal component of wavelength different from that of the other access providers;

b) transmitting the signal components as a multiwavelength signal;

c) receiving and power-splitting the multiwavelength signal into a plurality of distributed multiwavelength signals each associated with a respective remote user; and d) selectively filtering out, for each remote user, one of the signal components to provide the remote user with a selected one signal component of predetermined wavelength;

wherein step (d) further includes providing a card containing an optical filter, inserting the card into a remote optical network unit associated with the remote user, and positioning the card so that the optical filter is in position to intercept the respective multiwavelength signal and pass the selected one signal component.

2. The method of operating a passive optical network according to claim 1 in which step d) includes controlling the selective filtering to filter out another one of the signal components to provide the remote user with a different selected one signal component of predetermined wavelength.

3. The method of operating a passive optical network according to claim 2 in which step d) further includes providing the card with a program for the controlling of the selective filtering.

4. The method of operating a passive optical network according to claim 3 in which step d) further includes inserting the card into a remote optical network unit associated with the remote user.

5. The method of operating a passive optical network according to claim 1 in which step a) includes using a distributed feedback laser for providing the plurality of signal components each of predetermined wavelength.

6. The method of operating a passive optical network according to claim 1 wherein the remote user selects a different one signal component of predetermined wavelength by inserting a different card into the remote optical network unit.

7. The method of operating a passive optical network according to claim 1 further comprising the step of:

e) identifying the remote user as authorized to receive the selected one signal component of predetermined wavelength before transmitting the multiwavelength signal.

8. A passive optical network system for providing a predetermined wavelength of data to remote users comprising:

a multiple wavelength transmitter for transmitting a multiwavelength signal having a plurality of signal components each of predetermined wavelength, the multiwavelength signal being provided by a plurality of access providers, each access provider providing a signal component of wavelength different from that of the other access providers;

a power-splitting passive optical network for receiving and power-splitting the multiwavelength signal into a plurality of distributed multiwavelength signals each associated with a respective remote user;

a filter provided on a card for selectively filtering out, for each remote user, one of the signal components of the associated distributed multiwavelength signal to provide the remote user with a selected one signal component of predetermined wavelength and a plurality of remote optical network units each associated with a respective remote user and receiving a respective distributed multiwavelength signal from the power-splitting passive optical network;

wherein the card is inserted into a respective remote optical network unit and positioned to intercept the respective distributed multiwavelength signal for selectively passing the selected one signal component.

9. The passive optical network system according to claim 8 wherein said multiple wavelength transmitter includes a distributed feedback laser for providing the plurality of signal components each of predetermined wavelength.

10. The passive optical network system according to claim 8 further comprising a plurality of remote optical network units each associated with a respective remote user and receiving a respective distributed multiwavelength signal from the power-splitting passive optical network.

11. The passive optical network system according to claim 8 wherein the card is programmed for controlling of the selective filtering.

12. The passive optical network system according to claim 11 wherein the card identifies the remote user as authorized to receive the selected one signal component.

13. The passive optical network system according to claim 11 wherein the card is inserted into the remote optical network unit such that the filter is read by the remote optical network unit to selectively filter out the one of the signal components of the associated distributed multiwavelength signal.

14. The passive optical network system according to claim 8 wherein the remote optical network unit is situated within a personal computer miniature card interface adapter (PCMCIA).

15. The passive optical network system according to claim 12 wherein the card includes means for identifying the remote user.

16. The passive optical network system according to claim 15 wherein the means for identifying is selected from the group consisting of an optical filter, a magnetic strip, and a barcode.

17. The passive optical network system according to claim 8 wherein the filter is selected from the group consisting of a transmissive filter, a reflective filter, a holographic filter, an interference filter, and an optical filter.

* * * * *